(12) United States Patent
Harwood

(10) Patent No.: US 7,193,151 B2
(45) Date of Patent: Mar. 20, 2007

(54) ELECTRONIC ENCLOSURE

(75) Inventor: Walter Harwood, Streamwood, IL (US)

(73) Assignee: Charles Industries, Ltd., Rolling Meadows, IL (US)

(*) Notice: Subject to any disclaimer, the term of this patent is extended or adjusted under 35 U.S.C. 154(b) by 0 days.

(21) Appl. No.: 10/800,117

(22) Filed: Mar. 12, 2004

(65) Prior Publication Data

US 2005/0215090 A1 Sep. 29, 2005

(51) Int. Cl.
*H02G 3/08* (2006.01)

(52) U.S. Cl. .............................. 174/50; 174/37; 174/60; 174/39; 220/3.8; 312/351.2

(58) Field of Classification Search .................. 174/50, 174/53, 58, 57, 59, 60, 38, 39, 17 R, 17 CT; 312/351.2; 220/3.2, 3.3, 3.4, 3.5, 3.6, 3.7, 220/3.8, 4.02; 248/906; 361/664, 600, 602, 361/641

See application file for complete search history.

(56) References Cited

U.S. PATENT DOCUMENTS

| | | | | |
|---|---|---|---|---|
| 3,480,721 A | * | 11/1969 | Baumgartner | 174/38 |
| 3,538,236 A | * | 11/1970 | Baumgartner | 174/38 |
| 3,864,510 A | * | 2/1975 | Ramsey et al. | 174/51 |
| 4,365,108 A | * | 12/1982 | Bright | 174/50 |
| 4,631,353 A | * | 12/1986 | Marks | 174/38 |
| 5,384,427 A | | 1/1995 | Volk et al. | |
| 5,401,902 A | * | 3/1995 | Middlebrook et al. | 174/38 |
| D430,849 S | | 9/2000 | Leschinger et al. | |
| D436,101 S | | 1/2001 | McGovern et al. | |

(Continued)

OTHER PUBLICATIONS

Marconi Network Components: ProFORM® Series Non-Metallic Pedestals product specification, Sep. 2003.

*Primary Examiner*—Angel R. Estrada
(74) *Attorney, Agent, or Firm*—Leydig, Voit & Mayer, Ltd

(57) ABSTRACT

A pedestal enclosure for electronic components is provided. The pedestal enclosure includes a base section and a cover engageable with the base section so as to define an interior space. The base section has a generally rectangular configuration and having a plurality of longitudinally extending channels formed therein such that the base section is substantially self-supporting in the ground. The cover has a generally cylindrical configuration and is engageable with a cylindrical neck on the base section so as to define an interior space. A bracket system is supported on the base section and arranged in the interior space. The bracket system includes a pair of legs. The base section comprises front and rear housing sections that can be selectively assembled together and split apart without removal of the bracket system. A lock mechanism is arranged near the top or near the bottom of the cover. A first lock receptacle is arranged on the base section for receiving the lock mechanism when the cover is engaged with the base section and the lock mechanism is arranged near the bottom of the cover and a second lock receptacle is arranged on the bracket system for receiving the lock mechanism when the cover is engaged with the base section and the lock mechanism is arranged near the top of the cover. A splice bar is pivotably supported between the legs of the bracket system for movement between an locked position wherein a hook at each end of the splice bar engages a respective one of the legs of the bracket system and an unlocked position wherein the splice bar is disengaged from the legs of the bracket system.

33 Claims, 13 Drawing Sheets

U.S. PATENT DOCUMENTS

| | | |
|---|---|---|
| 6,182,846 B1 | 2/2001 | Leschinger et al. |
| 6,198,041 B1 | 3/2001 | Leschinger et al. |
| 6,244,635 B1 | 6/2001 | Leschinger et al. |
| 6,252,166 B1 | 6/2001 | Leschinger |
| 6,362,419 B1 * | 3/2002 | Gallagher et al. ............ 174/37 |
| 6,455,772 B1 | 9/2002 | Leschinger et al. |
| 6,462,269 B1 | 10/2002 | Leschinger et al. |
| 6,598,949 B2 | 7/2003 | Frazier et al. |
| 6,752,362 B1 * | 6/2004 | Gretz ........................ 248/530 |
| 2002/0096346 A1 | 7/2002 | Maloney et al. |

* cited by examiner

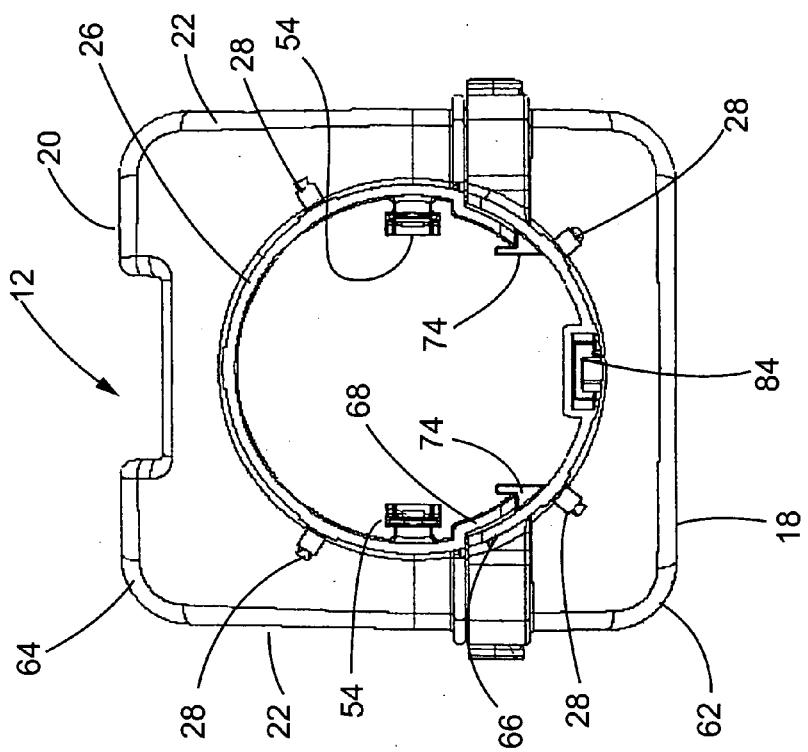
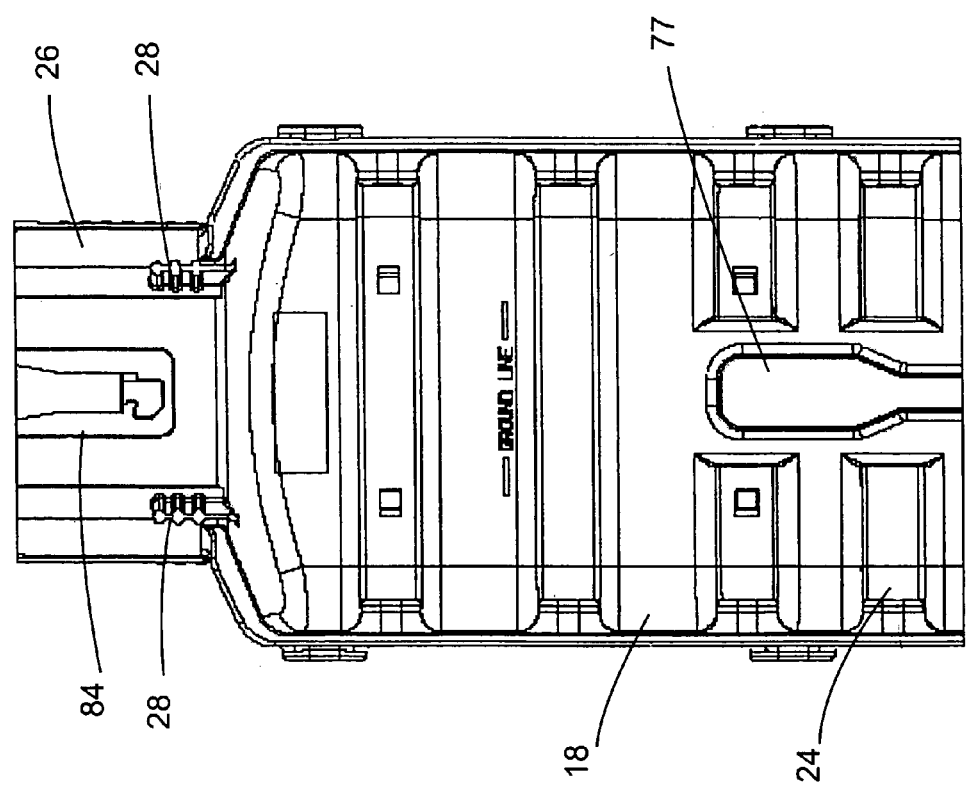

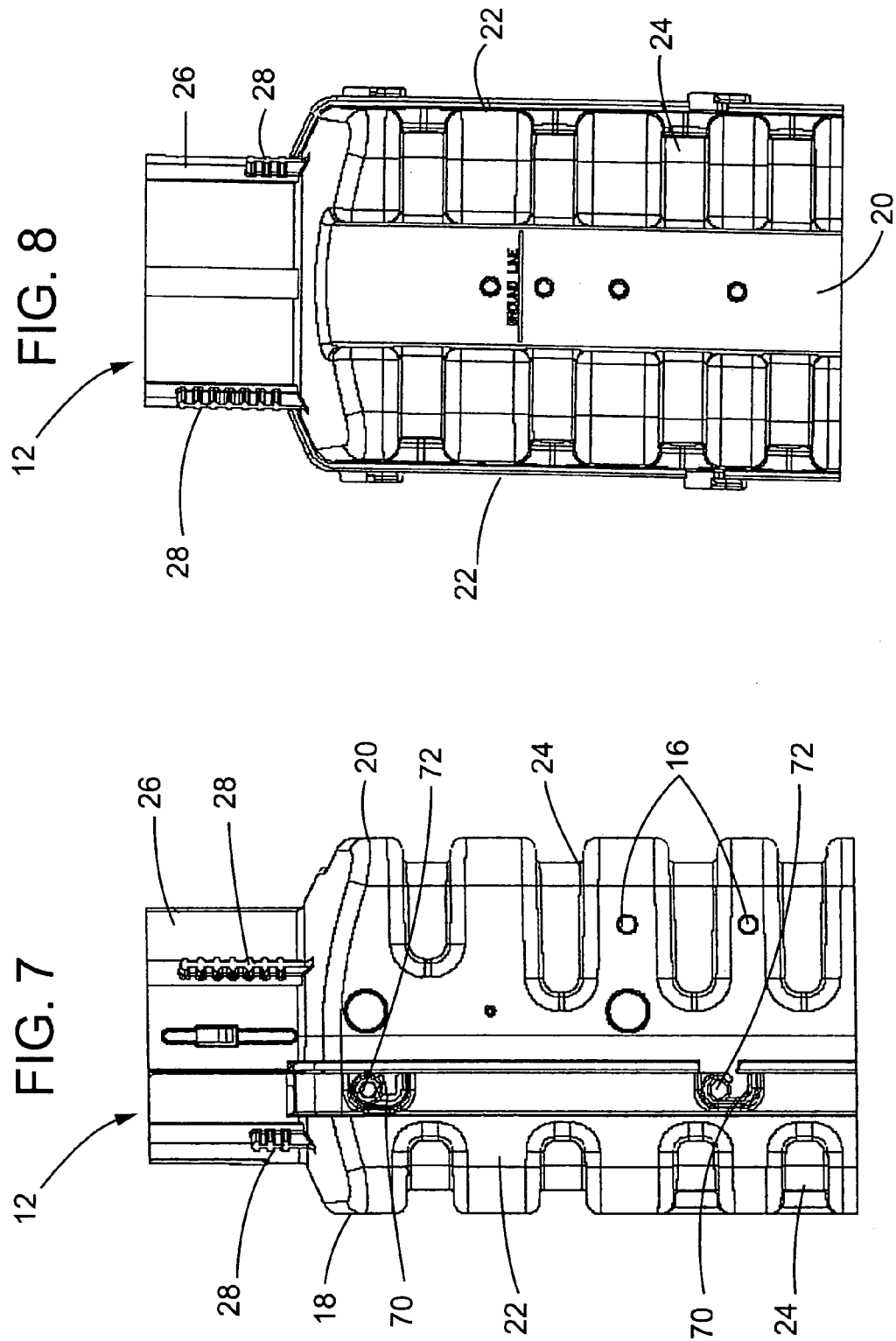

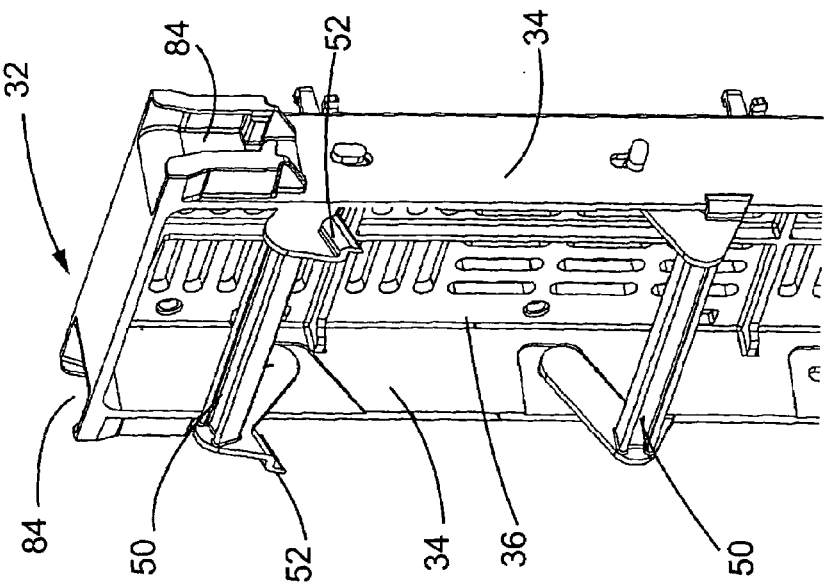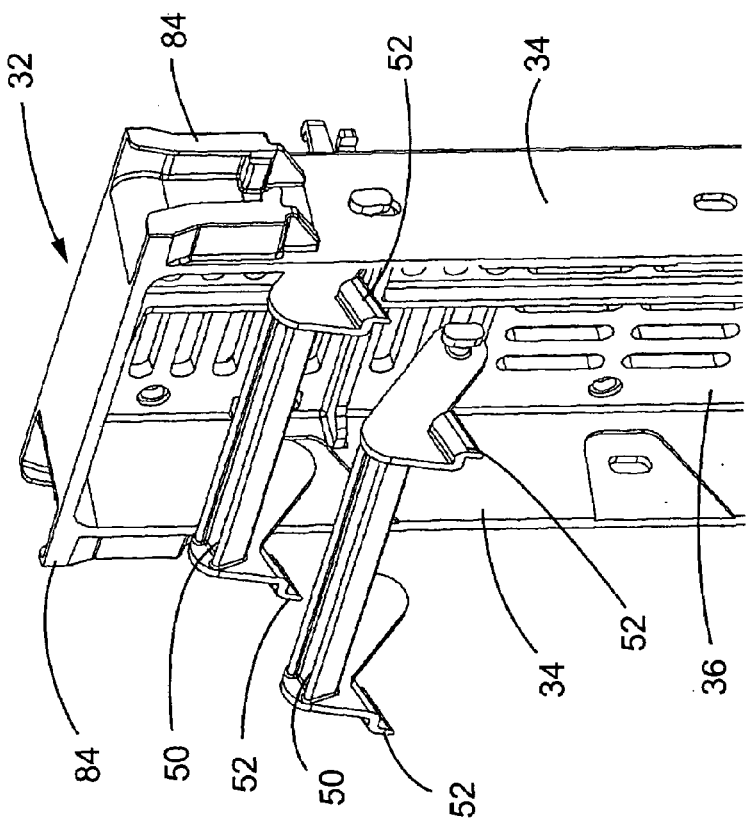

ELECTRONIC ENCLOSURE

FIELD OF THE INVENTION

This invention pertains to electronic enclosures and, more particular, to an electronics enclosure with improved flexibility and ease of use.

BACKGROUND OF THE INVENTION

Pedestal style electronics enclosures are used in telecommunications systems to house splices or terminal connections between service wires or distribution wires and buried telephone cables. Such pedestal enclosures can also be used to house connections to other types of buried utility cables such as for cable television, fiber optics or power distribution. A bracket system is generally provided on the interior of a pedestal enclosure to help arrange and support the cabling and various connections housed in the pedestal enclosure. Since pedestal enclosures are located outdoors, they must be substantially weather tight in order to protect the electronic connections from adverse environmental conditions such as wind, rain, snow and flooding. The pedestal enclosures also have to be relatively secure in order to guard against entry by unauthorized personnel and durable in order to withstand the wear-and-tear associated with being located in an outdoor environment.

Typically, pedestal enclosures include a base section and a cover that are secured together with a fastening or locking system. A bracket system is generally provided on the interior of a pedestal enclosure to help arrange and support the cabling and various connections housed in the pedestal enclosure. The particular bracket system used depends on the application in which the pedestal is being employed, e.g., cable distribution, cross connect capability, fiber distribution or splice capability. These bracket systems can be mounted in the interior of the pedestal enclosure in a variety of different ways.

Unfortunately, many existing pedestal enclosures are difficult to install and maintain. For instance, many pedestal enclosures require mounting stakes or other separate hardware to secure the pedestal enclosure in the ground. Many pedestal enclosures also are not readily adaptable to different field conditions and/or the requirements of different applications. Moreover, with many pedestal enclosures, it can be difficult to add, replace or update the wires, cable or other equipment in the pedestal enclosure once it is installed in the field. Similarly, components of the pedestal enclosure that are damaged or require upgrading such as wire channels or the bracket system can be difficult to replace once the pedestal is installed in the field. The locking systems of many pedestal enclosures are also awkward to operate. In addition, some pedestal enclosures do not provide the necessary protection against impacts, fires and the environment.

BRIEF SUMMARY OF THE INVENTION

The invention provides a pedestal enclosure for electronic components. The pedestal enclosure includes a base section and a cover engageable with the base section so as to define an interior space. A bracket system supported on the base section and arranged in the interior space. A lock mechanism arranged near the top or near the bottom of the cover. The lock mechanism includes a latch supported in a lock housing for movement between locked and unlocked positions. A first lock receptacle arranged on the base section for receiving the lock mechanism when the cover is engaged with the base section and the lock mechanism is arranged near the bottom of the cover and a second lock receptacle located on the bracket system for receiving the lock mechanism when the cover is engaged with the base section and the lock mechanism is arranged near the top of the cover. Each of the first and second lock receptacles defines a pocket for supporting the lock housing and is engageable with the latch when the latch is in the locked position so as to prevent disengagement of the cover from the base section.

The present invention also provides a pedestal enclosure for electronic components including a base section having a generally rectangular configuration and having a plurality of longitudinally extending channels formed therein such that the base section is substantially self-supporting in the ground. A cover having a generally cylindrical configuration is engageable with a cylindrical neck on the base section so as to define an interior space. A bracket system is supported on the base section and arranged in the interior space. The base section comprises front and rear housing sections that can be selectively assembled together and split apart without removal of the bracket system.

The present invention also provides a pedestal enclosure for electronic components including a base section, a cover engageable with the base section so as to define an interior space and a bracket system supported on the base section and arranged in the interior space. The bracket system includes a backboard supported by a pair of legs. A plurality of wire retaining guides are integrally connected to the backboard. The bracket system also includes a grounding bar having a pair of lances for snap engagement with corresponding slots in the legs of the bracket system.

The present invention also provides a pedestal enclosure for electronic components including a base section, a cover engageable with the base section so as to define an interior space and a bracket system supported on the base section and arranged in the interior space. The bracket system includes a pair of legs. A splice bar is pivotably supported between the legs of the bracket system for movement between a locked position wherein a hook at each end of the splice bar engages a respective one of the legs of the bracket system and an unlocked position wherein the splice bar is disengaged from the legs of the bracket system.

BRIEF DESCRIPTION OF THE DRAWINGS

FIG. 5 is a front view of the base section of the pedestal enclosure of FIG. 1.

FIG. 6 is a top view of the base section of the pedestal enclosure of FIG. 1.

FIG. 7 is a side view of the base section of the pedestal enclosure of FIG. 1.

FIG. 8 is a rear view of the base section of the pedestal enclosure of FIG. 1.

FIG. 13 is an enlarged partial perspective view of the bracket system of FIG. 10 showing one splice bar exploded from the bracket system.

FIG. 14 is an enlarged partial perspective view of the bracket system of FIG. 10 shown one splice bar in the locked position and one splice bar in the unlocked position.

DETAILED DESCRIPTION OF THE INVENTION

Figure 1:
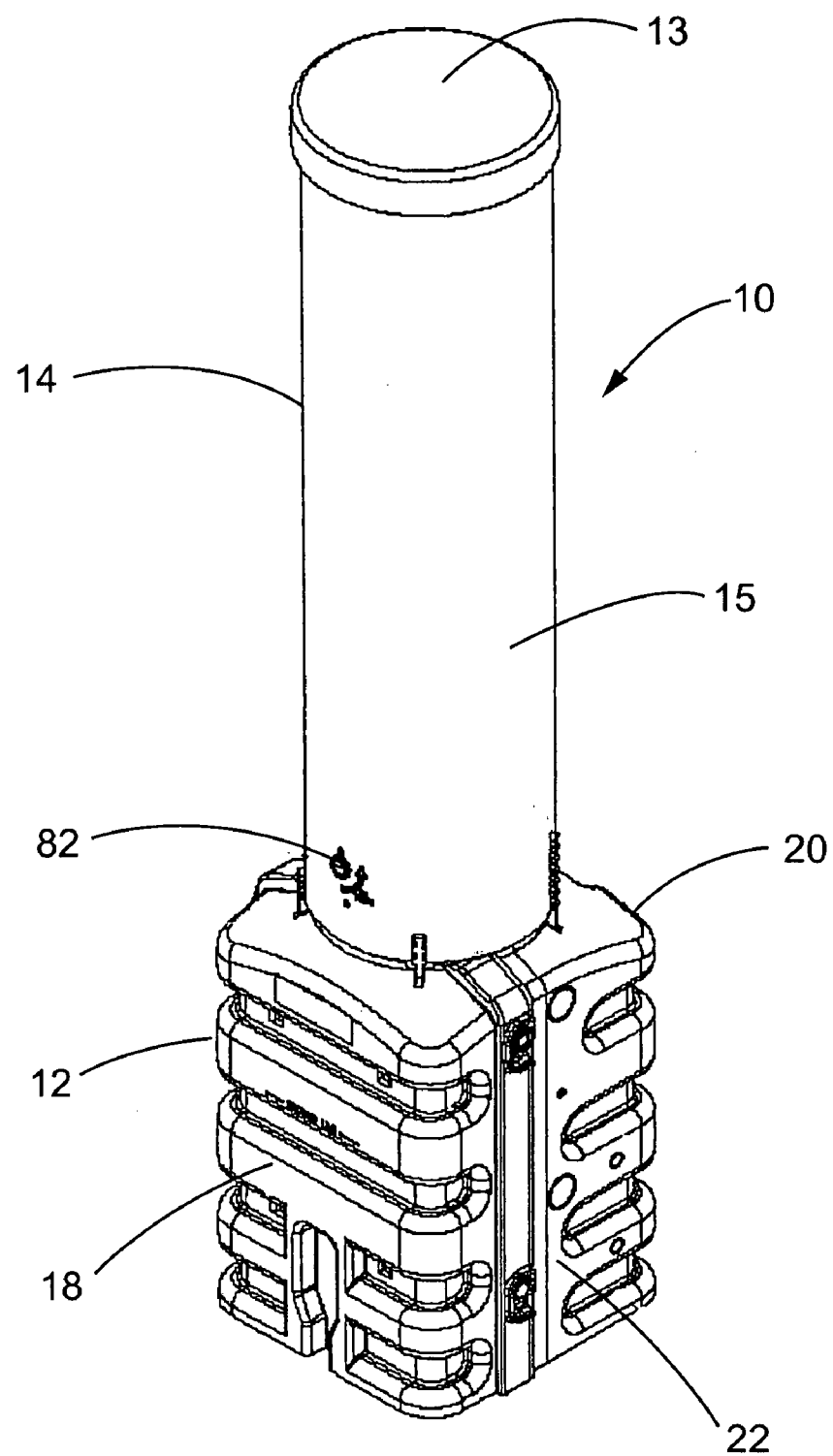
FIG. 1 is a perspective view of an exemplary pedestal enclosure according to the present invention.
Figure 2:
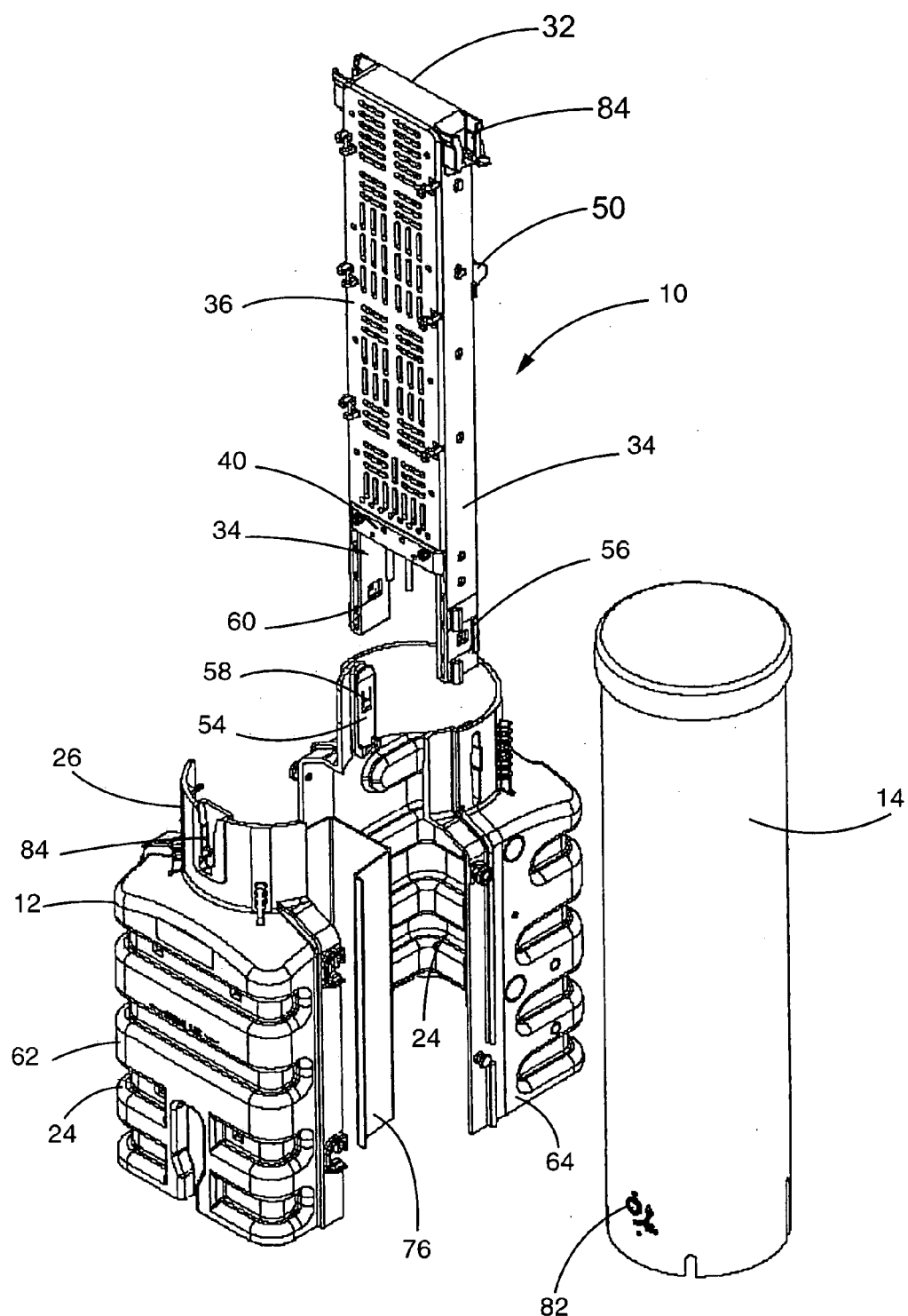
FIG. 2 is an exploded perspective view of the pedestal enclosure of FIG. 1.

Referring now to FIGS. 1 and 2 of the drawings, there is illustrated an exemplary pedestal enclosure 10 constructed in accordance with the teachings of the present invention. The illustrated pedestal enclosure 10 includes a base section 12 and a cover or dome 14. The cover 14 nests in a telescoping fashion over the base section 12 so as to define an interior space within the pedestal enclosure 10. This interior space can be used to house electronic equipment such as used in telecommunications, cable television or power transmission applications. The cover of the illustrated pedestal enclosure 10 is cylindrical in shape including a top or end wall 13 and a sidewall 15. As will be appreciated by those skilled in the art, the present invention is not limited to any particular pedestal enclosure size or configuration. Moreover, while the present invention is discussed in the context of telecommunication systems, the present invention is not limited to a pedestal enclosure for housing any particular type of electronic component.

When in use, at least a portion of the base section 12 is typically filled with dirt and/or gravel and buried in the ground. Underground cables can be fed into the interior space of the pedestal enclosure 10 through one or more openings in the base section 12. To provide the end user with flexibility regarding the number and location of any openings in the base section 12, the base section can include a plurality of knockouts 16 (see FIGS. 3 and 4) that could be selectively removed by the user. The knockouts 16 would allow any unneeded openings in the base section 12 to be eliminated thereby helping to reduce water infiltration into the pedestal enclosure 10 and the resultant condensation on the inside of the cover 14. The openings formed by using the knockouts 16 could be used to feed cables or wires into the pedestal enclosure 10 or for mounting stakes or other mounting hardware. In the illustrated embodiment, the knockouts 16 are in the form of areas where the base section 12 is weakened, such as by scoring or the like, so that the area can be readily punched out by an installer or technician in the field creating an opening in the base section. The knockouts 16, of course, could take other forms including for example removable plugs in the base section 12.

To allow the pedestal enclosure 10 to be substantially self-supporting (i.e. supported without any mounting stakes or other mounting hardware) in the ground, the illustrated base section 12 has a generally rectangular configuration including a front wall 18, a rear wall 20 and a pair of opposing sidewalls 22 with an open bottom (see FIGS. 3–8). This rectangular configuration provides a relatively large surface contact area between the base section 12 and the surrounding ground as compared, for example, to base sections having cylindrical configurations. In addition, the base section 12 has a plurality of integrally formed, horizontally extending channels 24. The channels 24 extend into the interior of the base section 12 (see, e.g., FIG. 3) and define corresponding ridges on the inside surface of the walls of the base section 12. Thus, the walls of the base section 12 have a corrugated configuration that both increases their strength and allows the dirt or gravel to infiltrate better around the base section making the base section harder to remove from the ground.

Figure 9:
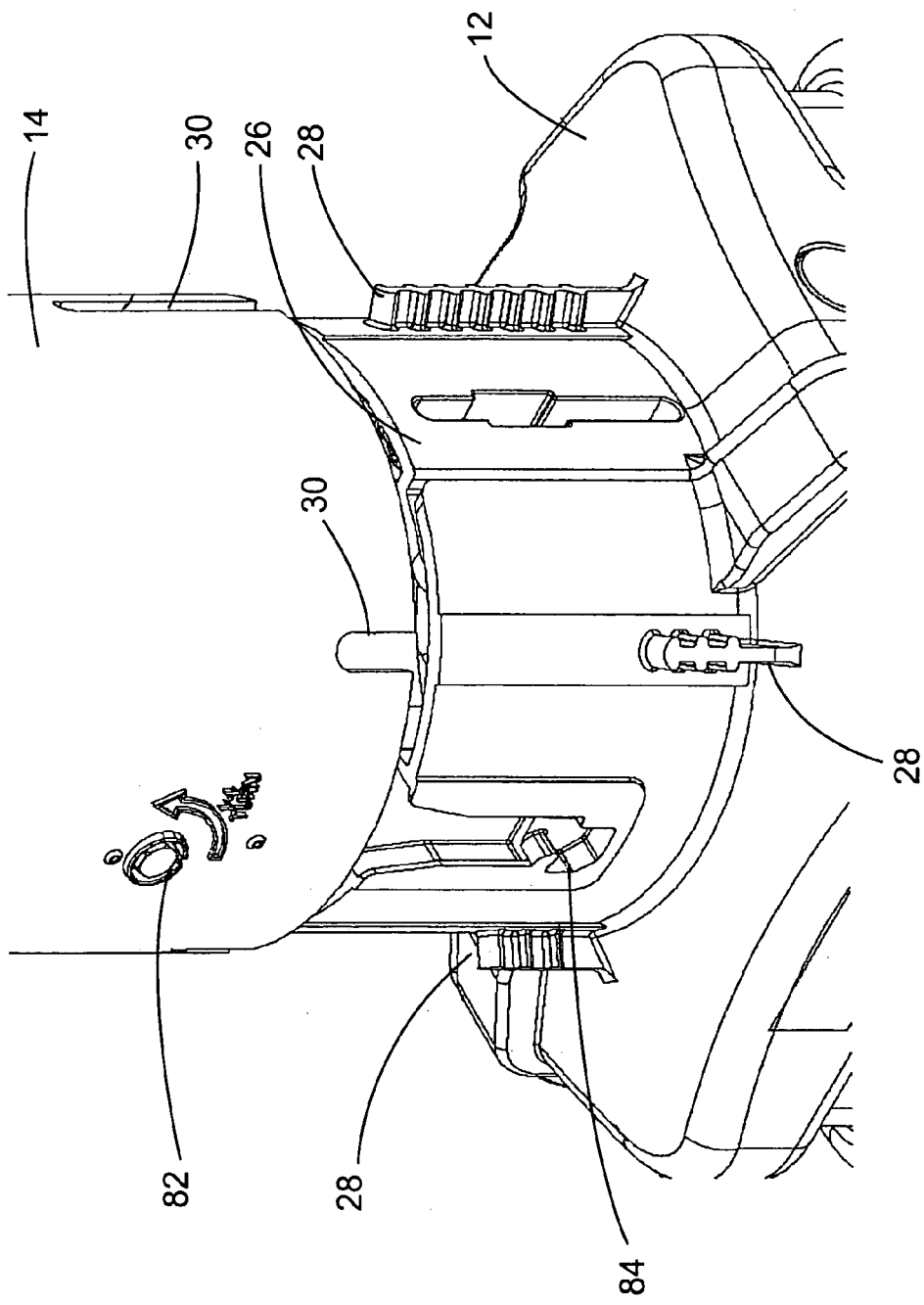
FIG. 9 is an enlarged perspective view showing the mating of the cover and base section of the pedestal enclosure of FIG. 1.

To allow the base section 12 to mate with a cylindrically configured cover such as the cover 14, the illustrated base section includes a cylindrical neck 26. The ability to mate with a cylindrical cover is advantageous because such covers are recognized as a reliable commodity in the telecommunications industry and are in common usage. As shown in FIG. 9, the neck 26 can have a plurality of circumferentially spaced vertically extending tabs 28 that engage corresponding slots 30 in the lower edge of the cover 14 when the cover is placed over the neck of the base section 12. In this case, one of the tabs 28 and one of the slots 30 have slightly longer configurations such that the cover 14 can only be placed on the base section 12 in one orientation. This feature is useful in situations where the cover 14 includes labeling that needs to face a particular direction to be visible to technicians, e.g. as the technicians pass by the pedestal enclosure 10 in a truck. The engagement of the tabs 28 with the slots 30 also helps limit movement of the cover relative to the base section 12. As will be appreciated, automatic alignment of the cover 14 relative to the base 12 in a desired orientation also can be accomplished in other ways, such as by arranging the tabs 28 and slots 30 relative to one another such that they can only mate with the cover 14 in a particular desired orientation relative to the base section 12.

Figure 10:
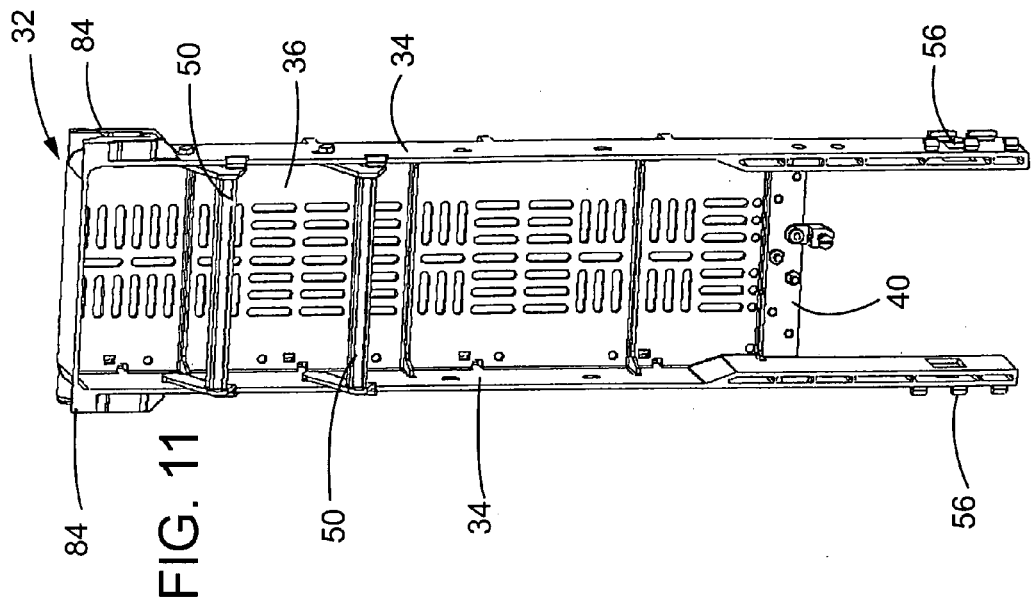
FIG. 10 is a front perspective of an exemplary bracket system for a pedestal enclosure according to the present invention.
Figure 11:
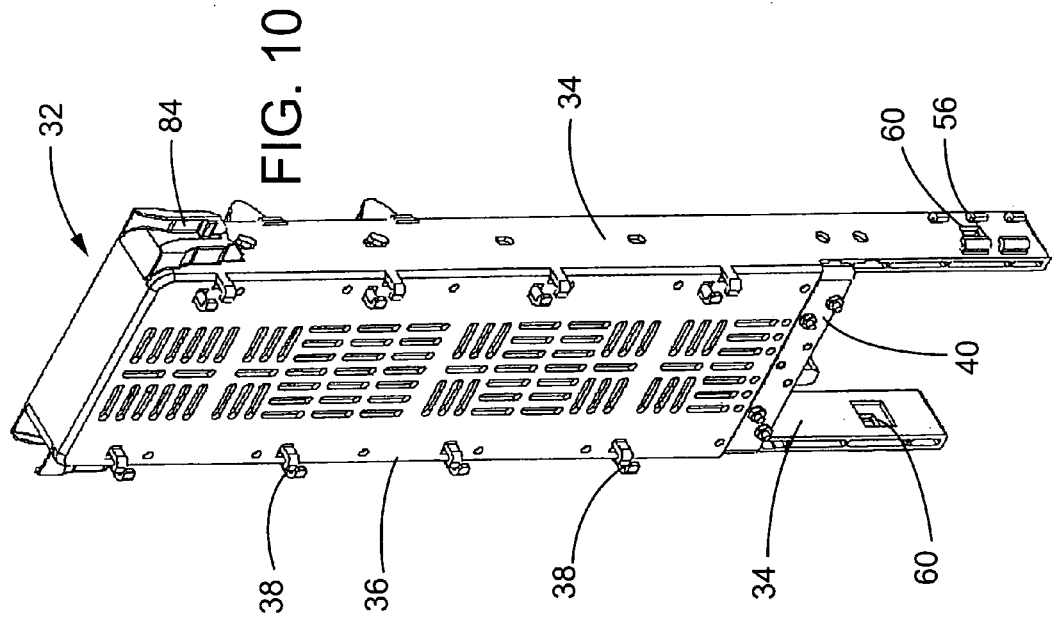
FIG. 11 is a rear perspective view of the bracket system of FIG. 10.

To support the cabling, connections or other electronics housed in the pedestal enclosure 10, a bracket system 32 is provided. The illustrated bracket system 32 generally includes a pair of legs 34 between which extends on one side of a backboard 36 (see FIGS. 10 and 11). The backboard 36 has a generally planar configuration and includes a plurality of openings. To facilitate the routing or dressing of wires and cables along the backboard 36, the backboard also includes a plurality of wire retaining guides 38 (see FIG. 10). Advantageously, these wire retaining guides 38 can be integrally formed, molded or otherwise attached to the backboard 36. With existing backboards, the wire retaining guides are separate parts that snap onto the backboard. These separate parts, however, are expensive and easily misplaced or lost. The integral wire retaining guides 38 used on the illustrated backboard 36 are more economical to manufacture and will not get misplaced or lost since they are permanently attached to the backboard.

Figure 12:
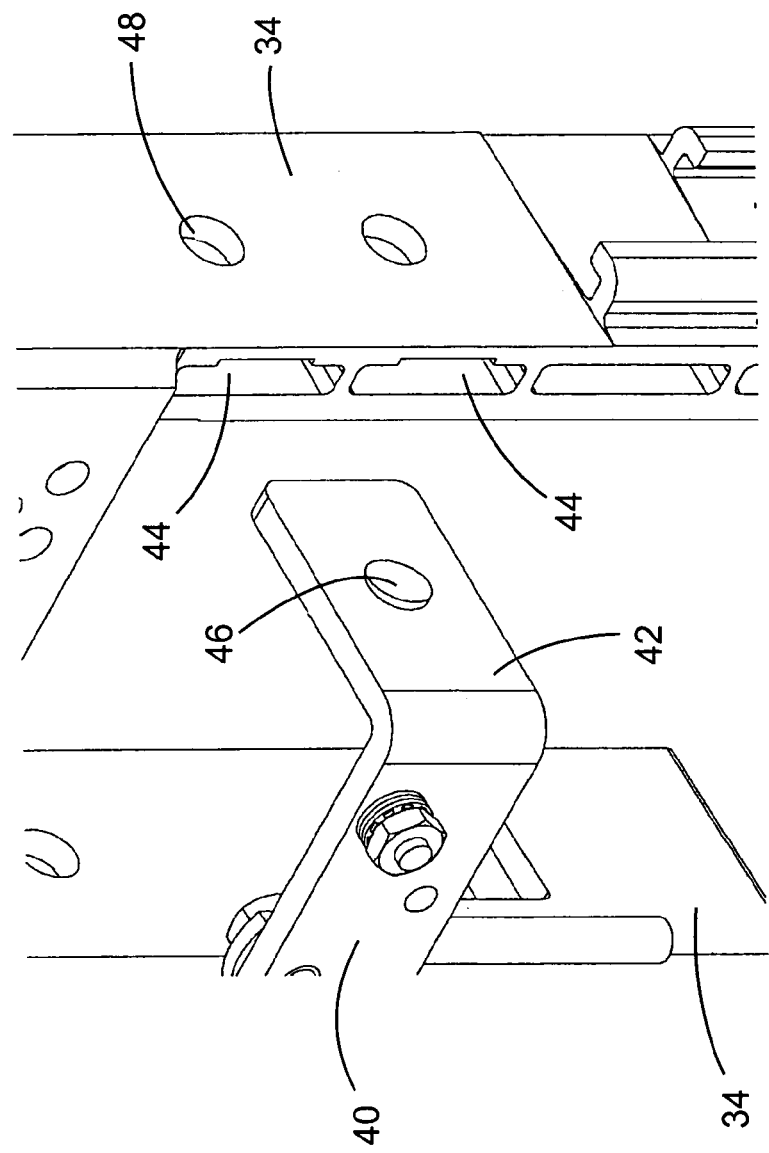
FIG. 12 is an enlarged partial view of the snap-in grounding bar of the bracket system of FIG. 10.

The backboard 36 can also include a grounding bar 40 for providing a ground connection for the electronics housed in the pedestal enclosure 10. The grounding bar 40 is made of metal or any other electrically conductive material. Conventionally, grounding bars are attached to the backboard or bracket system using separate screws and nuts. However, to simplify the attachment process, the illustrated grounding bar 40 incorporates a snap-in connection system. More specifically, as best shown in FIG. 12, a leg 42 is provided at each end of the grounding bar 40 (only one end is shown in FIG. 12). These legs 42 are received in corresponding slots 44 provided in the legs 34 of the bracket system. For securing the legs 42 in the slots 44, a lance 46 is provided on the side of each leg 44 that engages a corresponding opening 48 in the side of each slot 44. To provide flexibility with regard to where the grounding bar 40 is mounted or to allow multiple grounding bars to be attached to the bracket system 32, a plurality of pairs of slots 44 are provided in the legs 34 of the bracket system for receiving the grounding bar legs 42.

The illustrated bracket system 32 can also include one or more splice bars 50 that extend between the legs 34 of the bracket system 32 behind the backboard 36. These splice bars 50 provide support for splices in the pedestal enclosure 10. To ensure that the splices are properly supported as well as provide for additional flexibility during installation and maintenance, the splice bars 50 can be supported on the legs for movement between locked and unlocked positions as shown in FIGS. 13 and 14. In particular, each end of each illustrated splice bar 50 is pivotably secured to a respective one of the legs 34 of the bracket system 32 such that the splice bars 50 can pivot upwardly from a locked position to an unlocked position. In the locked position (see the lower splice bar 50 in FIG. 14), a L-shaped hook 52 on the outside of each of the two legs of the splice bar engages a respective one of the bracket system legs 34. The engagement of the hooks 52 on the splice bars 50 with the legs 34 secures the splice bar 50 in the orientation in which the splice bar's load carrying capacity is maximized. However, when installing or doing maintenance on equipment in the pedestal enclosure 10, the splice bars 50 can be selectively pivoted upward out of the locked position into an unlocked position (see the upper splice bar in FIGS. 13 and 14) wherein the hooks 52 are disengaged from the legs of the bracket system 32. Moving the splice bars 50 to the unlocked position can make it easier for technicians to install or perform maintenance on the equipment in the pedestal enclosure 10. Once the work is completed, the splice bars 50 can then be pivoted back into the locked position before the cover 14 is placed back on the base section 12. Moving the splice bars 50 back to the locked position helps ensure that the splice bars will provide sufficient support to the splices in the enclosure.

Figure 15:
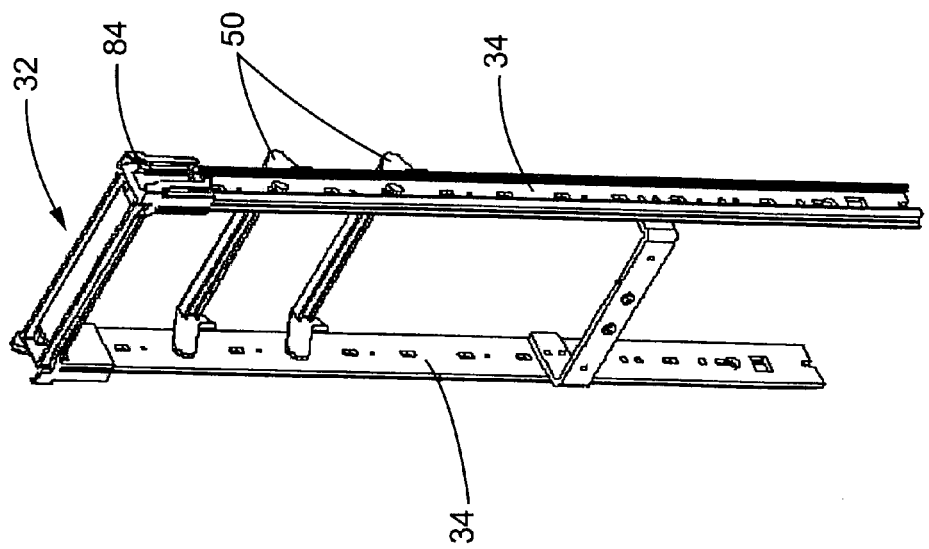
FIG. 15 is a perspective view of an alternative bracket system for a pedestal enclosure according to the present invention.

Those skilled in the art will appreciate that the present invention is not limited to any particular bracket system configuration. Rather, a bracket system of any desired configuration can be used including, for example, internal splice bracket systems (see, e.g., FIG. 15), universal backboard bracket systems and bracket systems having a wire or fiber splice closure.

For securing the bracket system 32 to the pedestal enclosure 10, a mounting arrangement is provided which permits quick and easy mounting and removal of the bracket system to and from the pedestal enclosure without the use of any tools. Specifically, in the case of the illustrated embodiment, the bracket system 32 is simply slid onto complementary mounting parts 54 (see FIG. 2) provided on the pedestal and automatically locked in position. The bracket system 32 can be removed simply by manually releasing a locking mechanism from engagement with the bracket system. The mounting arrangement 32 can be universally applied to different pedestal and bracket system configurations.

Figure 3:
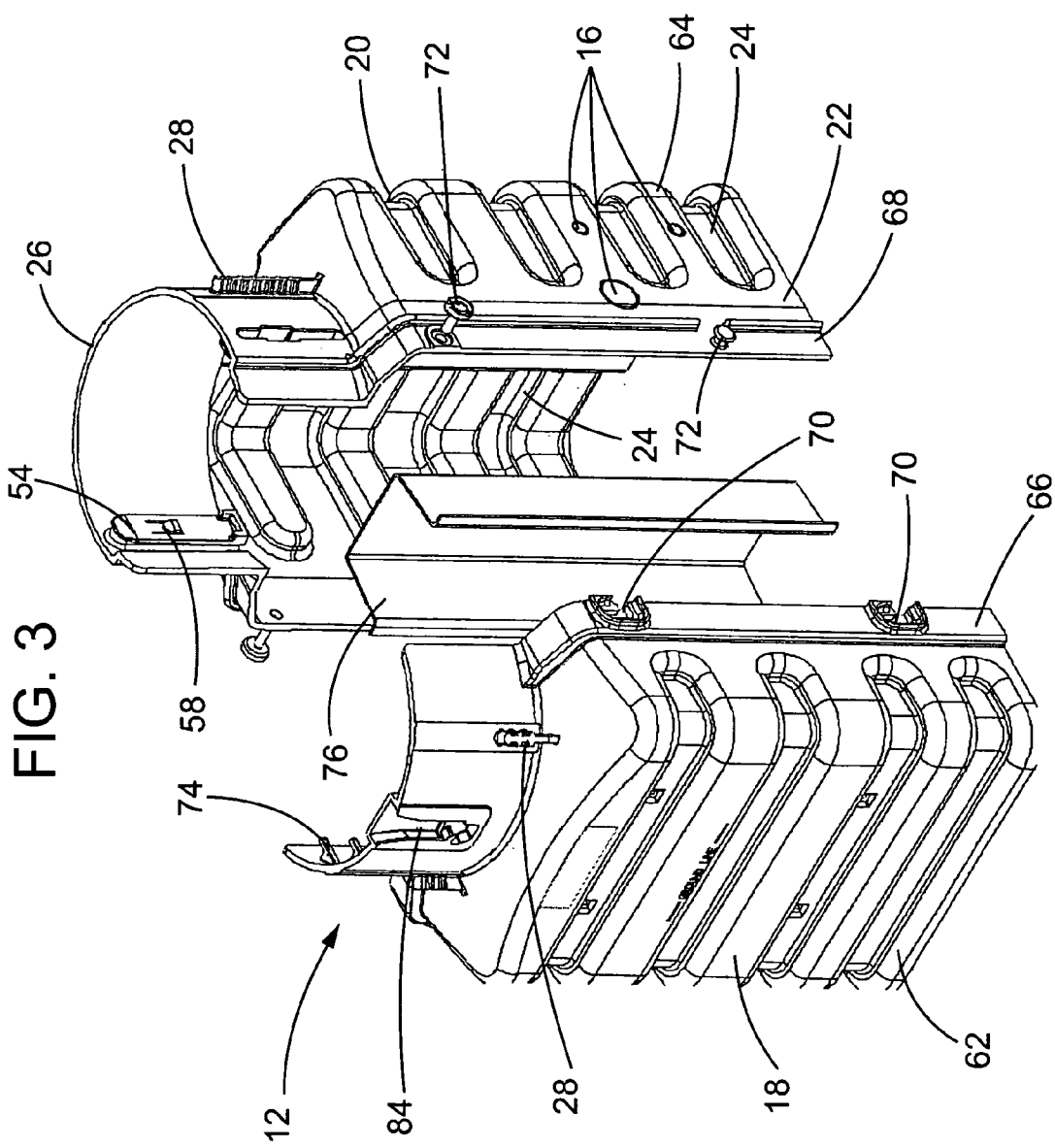
FIG. 3 is a perspective view of the base section of the pedestal enclosure of FIG. 1 showing the front and rear housing sections split.
Figure 4:
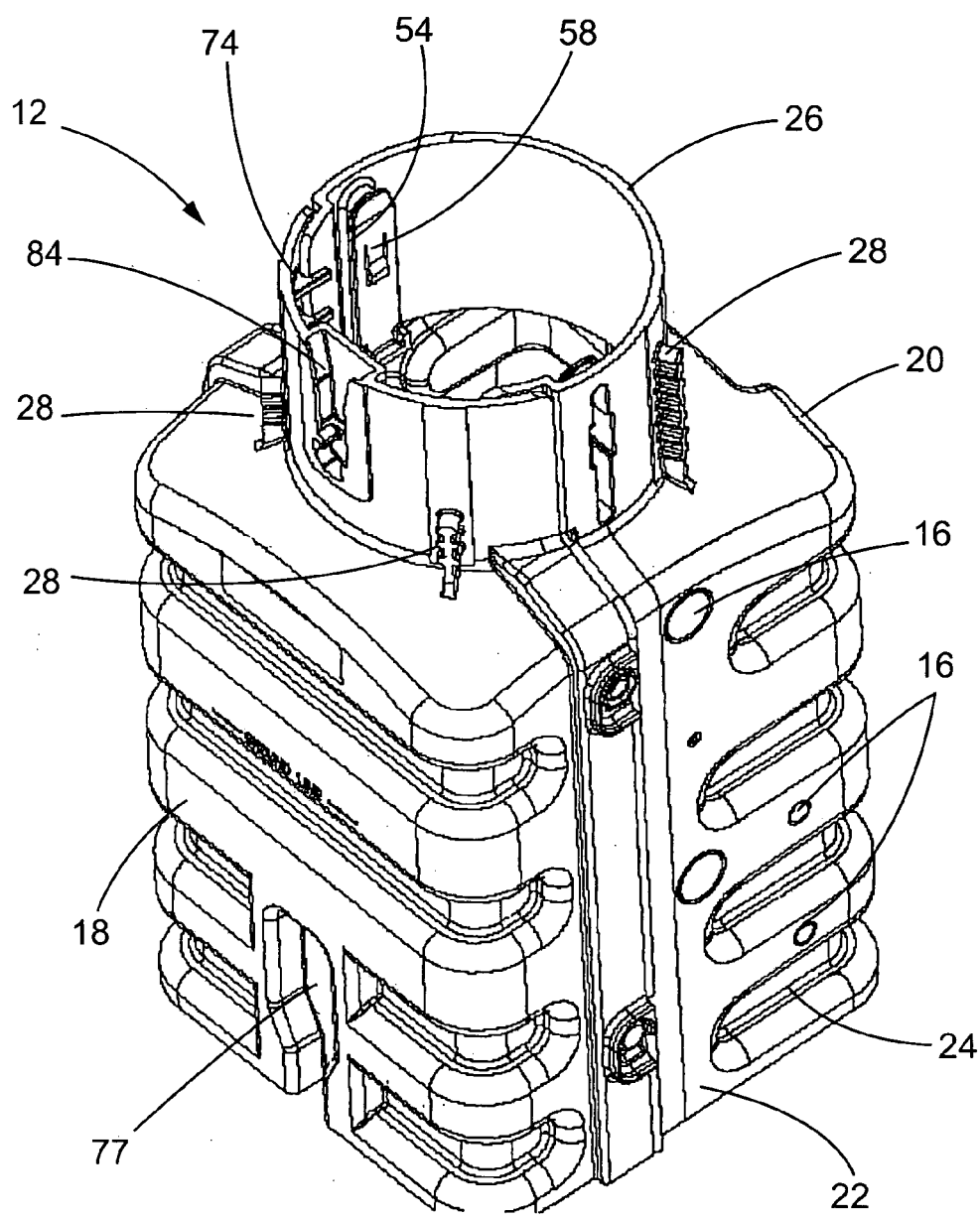
FIG. 4 is a perspective view of the base section of the pedestal enclosure of FIG. 1.

In the illustrated embodiment, two mounting parts 54 are provided on the base section 12 of the pedestal enclosure 10 (see FIGS. 3, 4 and 6). In this case, the mounting parts 54 are integrally connected to the base section 12. The two mounting parts 54 are arranged opposite each other on the inside of the sidewall 22 of the base section 12 and are spaced from one another such that each can engage a respective one of the legs 34. In other embodiments, additional mounting parts 34 can be provided. For example, three mounting parts 54 could be provided in the base section 12 to accommodate bracket systems having three legs. Each of the mounting parts 34 is configured to be received in a channel section 56 (see FIGS. 2, 10 and 11) provided at the lower end of the each of the legs 34 of the bracket system 32. With such an arrangement, the bracket system 32 can be installed in the pedestal enclosure 10 by lowering the bracket system legs 34 into engagement with the mounting parts 54. In this case, each of the channel sections 56 defines only a partial channel at the lower end of the leg 34. Alternatively, each of the channel sections 56 can define a continuous channel that extends the entire length of the respective leg 34.

In order to prevent unintentional removal of the bracket system 26 once the channel sections 56 are engaged with the mounting parts 54, the mounting arrangement includes a locking mechanism. In the illustrated embodiment, the locking mechanism has a snap-action that automatically engages the locking mechanism when the channel- sections 56 are engaged with the mounting parts 54. Moreover, the locking mechanism is manually releasable so as to allow a technician to disengage the locking mechanism and remove the bracket system 32 as desired. The locking mechanism, in this case, includes a spring tab 58 (see FIGS. 3 and 4) on each of the mounting parts 54 that engages a corresponding window 60 (see FIGS. 2 and 10) in the respective channel section 56 when the channel sections are slid over the mounting parts. Additional details regarding the illustrated bracket system mounting arrangement can be found in commonly owned application Ser. No. 10/789,145 entitled "Universal Mounting Arrangement For Components Of An Electronics Enclosure" and naming Walter Harwood as inventor the disclosure of which is incorporated herein by reference.

As shown in FIG. 3, the base section 12 can have a split configuration in order to facilitate repair or replacement of the cables or other electronics in the pedestal enclosure 10 once it has been installed in the field. Specifically, the base section 12 includes mating front and rear housing sections 62, 64 that can be selectively separated from each other even after the pedestal enclosure 10 has been installed in the field without disturbing (e.g., removal of) the bracket system 32. To this end, in the illustrated embodiment, the mounting parts 54 of the bracket mounting arrangement are both provided on the rear housing section 64 so that the front housing section 62 can be removed without disturbing the bracket system 32.

To ensure that a strong and tight connection is formed between the two housing sections 62, 64 when the base section 12 is assembled, the front and rear housing sections include leading edges 66, 68 that overlap each other when the two sections are secured together. In this case, the leading edge 68 of the rear housing section 64 extends inside of the leading edge 66 of the front housing section 64 when the sections are assembled together as shown in FIG. 6. A manually releasable fastening system also can be provided for securing the two housing sections 62, 64 together. In the illustrated embodiment, the fastening system comprises a pair of L-shaped slots 70 in the leading edge 66 on each side of the front housing section 62. These slots 70 engage complementary studs 72 provided on the two sides of the leading edge 68 of the rear housing section 64 (see FIG. 3). To facilitate the connection and separation of the two housing parts 62, 64, the lower two studs 72 are integrally connected to the rear housing section 64 while the upper two studs 72 are separate components that can be tightened down on the overlapping section of the two housing sections 62, 64. Those skilled in the art will appreciate that other fastening systems could also be used.

To ensure that the front and rear housing sections 62, 64 remain properly aligned even when loads are applied to the base section 12, the fastening system for the front and rear housing sections can include alignment braces 74. In the illustrated embodiment, an alignment brace 74 is arranged near the leading edge 66 on each side of the front housing section 62 as best shown in FIGS. 3 and 6. Each alignment brace 74 defines a generally L-shaped surface that engages the leading edge 68 of the rear housing section 64 when the base section 12 is assembled (see FIG. 6). One leg of the L-shaped surfaces supports and helps prevent movement of the two housing sections 62, 64 when a load is applied to either of the lateral sides 22 of the base section 12 while the other leg supports and helps prevent relative movement of the two housing sections when a load is applied to either the front or rear wall 18, 20 of the base section 12.

Figure 16:
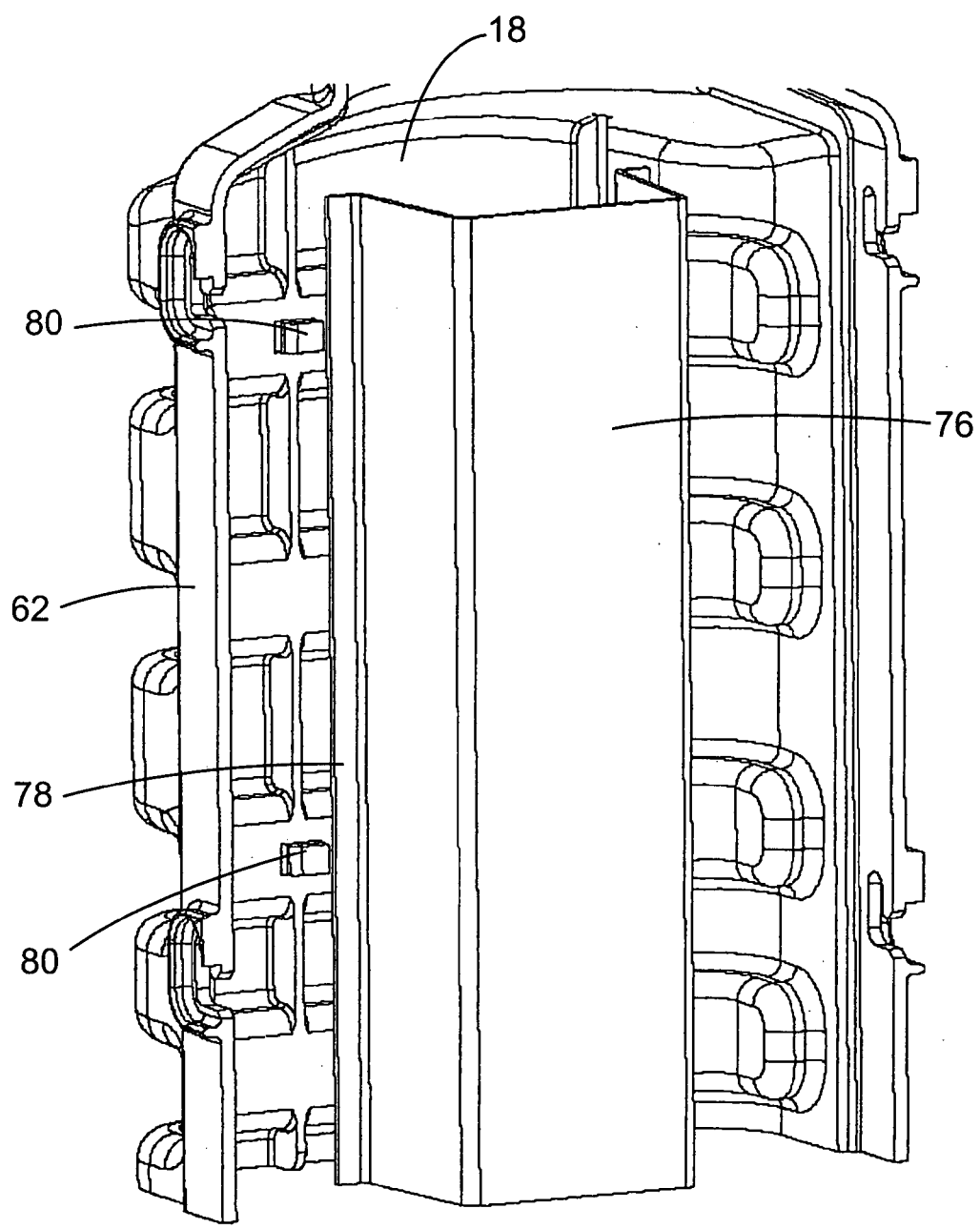
FIG. 16 is a rear perspective view of a front housing section of the base section of a pedestal enclosure according to the present invention showing the wire service channel.

To help secure the underground wires or cables that are fed into the pedestal enclosure 10 as they extend up to the bracket system 32, the base section 12 can include a wire service channel 76. As best shown in FIG. 16, when installed, the wire service channel 76 is arranged on the inside of the front wall 18 of the base section 12 so as to define a vertically extending passage in the base section that is open at its upper and lower ends. A knockout for a mouse hole 77 (see FIGS. 4 and 5) can also be provided in the front wall 18 of the base section 12 that, when punched out, facilitates the feeding of the wires or cables into the wire service channel 76. In this case, the wire service channel 76 can be snapped in and out of the base section 12 so as to provide additional flexibility when installing, maintaining or updating the pedestal enclosure. In particular, the illustrated wire service channel 76 has a generally U-shaped configuration with a flange 78 extending along each edge of the channel. These flanges 78 can be snapped into corresponding tabs 80 provided on the inside surface of the front wall 18 of the base section 12 (see FIG. 16). Other releasable fastening systems could also be used to secure the wire service channel 76 to the base section 12.

Figure 18:
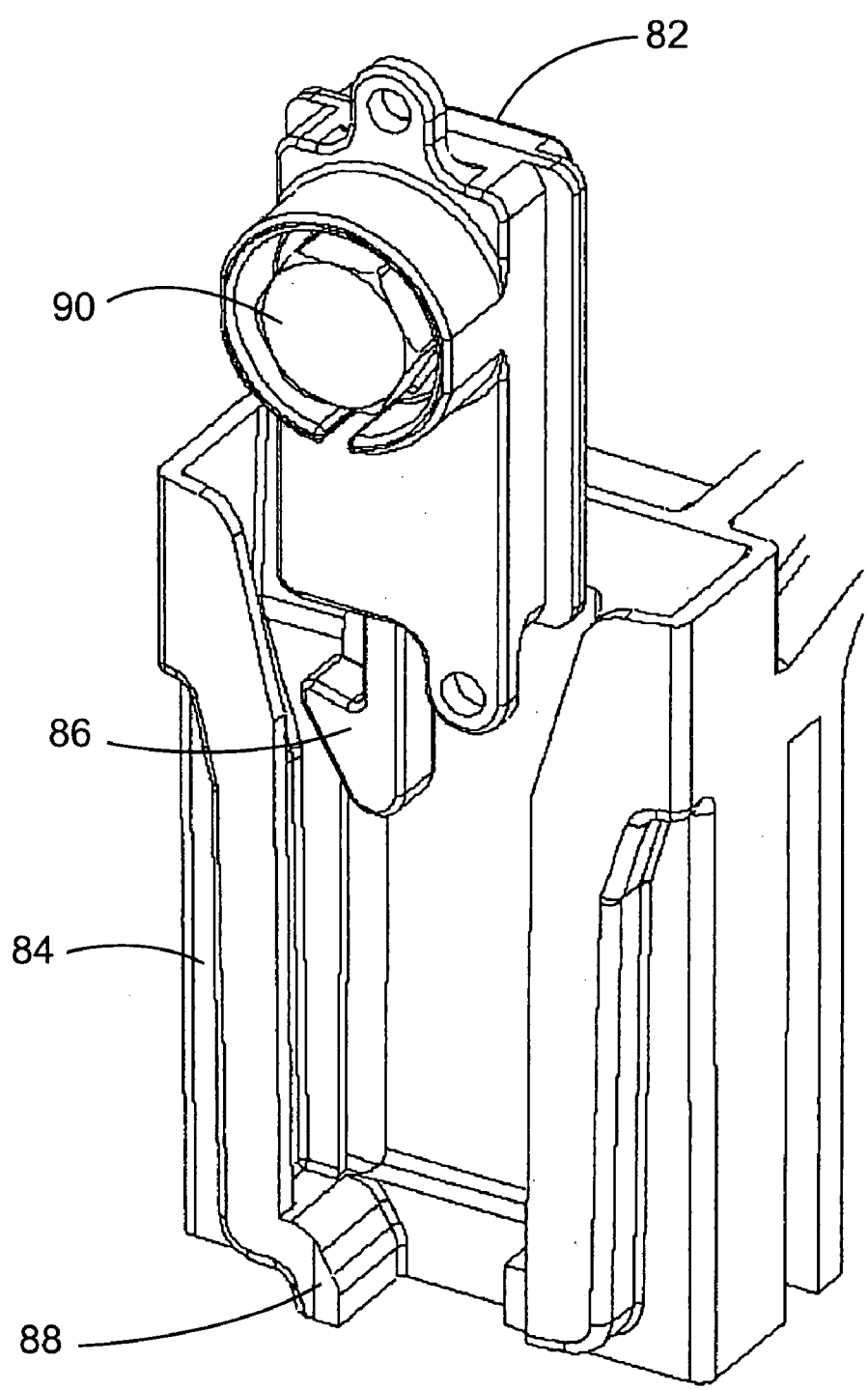
FIG. 18 is an enlarged perspective view showing a locking system for a pedestal enclosure according to the present invention.

To secure the cover 14 to the base section 12, the illustrated pedestal enclosure 10 includes a locking system. The locking system generally includes a lock mechanism 82 supported on the cover 14 and a lock receptacle 84 supported directly or indirectly on the base section 12. The lock receptacle 84 is adapted and arranged to capture and engage the lock mechanism 82. More specifically, as shown in FIG. 18, the lock receptacle 84 is configured to define a pocket into which the lock mechanism 82 is lowered when the cover 14 is placed on the base section 12. For engaging the lock receptacle 84, the lock mechanism 82 includes a pivotable latch 86 that engages a catch 88 at the lower end of the lock receptacle 84. To unlock the cover 14 from the base 12, a lock rotator head 90 is engaged with a tool that then can be used to turn the rotator so as to move the latch 86 to the unlocked position. Once the latch 86 is in the unlocked position, the lock mechanism 82 can move upward relative to the lock receptacle 84 past the catch 88.

Figure 17:
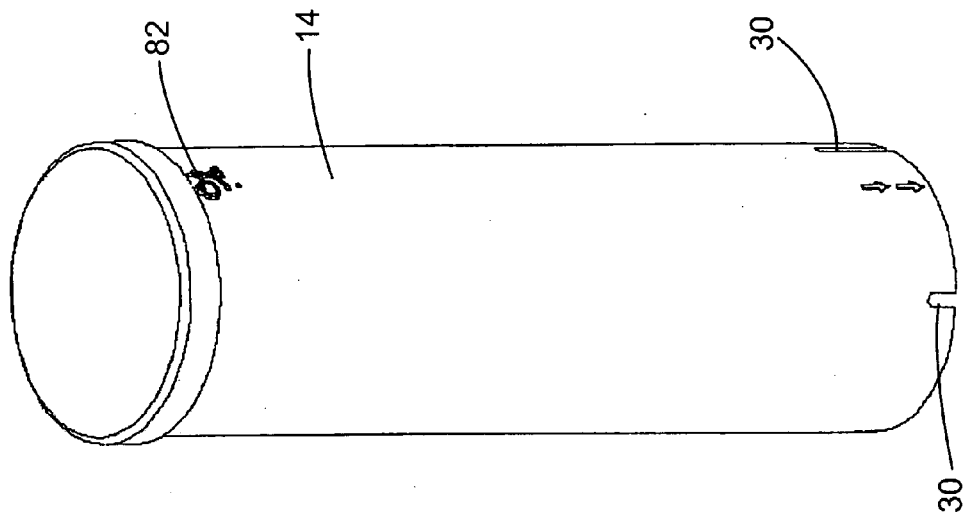
FIG. 17 is a perspective view of a cover for a pedestal enclosure according to the present invention.

Due to its relatively simple construction, the locking system can be provided in a variety of different locations on the pedestal enclosure 10. To this end, the illustrated pedestal enclosure 10 includes a receptacle 84 on the base section 12 for receiving a lock mechanism 82 arranged near the lower end of the cover 14 (see FIGS. 2–4 and 9). This lower location for the locking system enables the cover 14 to maintain a bell jar effect that provides the contents of the pedestal enclosure 10 with additional protection against rising floodwaters. The illustrated pedestal enclosure 10 also includes a lock receptacle 84 arranged near the upper end of one of the legs 34 of the bracket system 32 (see FIGS. 2 and 10–14) for receiving a lock mechanism 82 arranged near the upper end of the cover 14 (see FIG. 17). In this upper position, the locking system is more accessible to technicians in the field. In the illustrated embodiment, a lock receptacle 84 is provided at the upper end of each of the legs 34 of the bracket system 32. Additional details regarding the illustrated locking system can be found in co-pending, commonly owned application Ser. No. 10/797,392 entitled "Locking System For An Electronics Enclosure" and naming Walter Harwood as inventor the disclosure of which is incorporated herein by reference.

Because the illustrated pedestal enclosure includes both an upper lock receptacle 84 on the bracket system 32 and a lower lock receptacle 84 on the base section 12, the pedestal enclosure can be used with covers 14 having lock mechanisms 82 arranged at the top (see FIG. 17) and covers having lock mechanisms arranged at the bottom (see FIG. 2). This flexibility allows the base section 12 and bracket system 32 to be manufactured with a standard configuration no matter whether an upper or lower location for the lock mechanism 82 is preferred by the end user. Similarly, the flexibility also allows one type of cover 14 (e.g., top lock) to be easily switched out for another type of cover 14 (e.g., bottom lock) after the pedestal enclosure 10 has been installed in the field.

From the foregoing, those skilled in the art will appreciate that the present invention provides a pedestal enclosure that can include one or more features that improve the flexibility and ease of use of the pedestal enclosure. These features can include, among others, a self-supporting base section, a split base section, knockout portions in the base section, a snap-in wire service channel, a bracket system with integral wire guides, a snap-in grounding bar and movable spice bars, a bracket system that can be mounted and removed with the use of any tools and a lock system that can be arranged at either the top or the bottom of the pedestal enclosure. Advantageously, a pedestal enclosure having one or more of these features is particularly suited for being constructed in compliance with the GR-13-CORE specification standards for use in outside telecommunications applications. Of course, it will be understood that the present invention is not limited to any particular feature or combination of features.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pedestal enclosure for electronic components, the enclosure comprising:
    a base section;
    a cover engageable with the base section so as to define an interior space;
    a bracket system supported on the base section and arranged in the interior space;
    a lock mechanism arranged near the top or near the bottom of the cover, the lock mechanism including a latch supported in a lock housing for movement between locked and unlocked positions; and
    a first lock receptacle arranged on the base section for receiving the lock mechanism when the cover is engaged with the base section and the lock mechanism is arranged near the bottom of the cover and a second lock receptacle arranged on the bracket system for receiving the lock mechanism when the cover is engaged with the base section and the lock mechanism is arranged near the top of the cover;
    each of the first and second lock receptacles defining a pocket for supporting the lock housing and being engageable with the latch when the latch is the locked position so as to prevent disengagement of the cover from the base section.

2. The pedestal enclosure of claim 1 further including a mounting arrangement for releaseably mounting the bracket system to the base section, the mounting arrangement including a channel section at the lower end of each of a pair of legs of the bracket system and a mounting part supported on the base section, each of the mounting parts being configured and arranged to be received in and engage a respective one of the channel sections.

3. The pedestal enclosure of claim 2 wherein the mounting arrangement includes a manually releasable locking mechanism including a window in each of the channel sections and a flexible spring tab supported on each of the mounting parts, each spring tab being engageable with one of the channel sections when the mounting parts are received in the channel sections.

4. The pedestal enclosure of claim 1 wherein the base section comprises front and rear housing sections that can be selectively assembled together and split apart.

5. The pedestal enclosure of claim 4 further including an alignment brace arranged on opposing sides of a leading edge of one of the front or rear housing sections and defining a generally L-shaped surface that engages opposing sides of a leading edge of the other of the front or rear housing sections when the front and rear housing sections are assembled together.

6. The pedestal enclosure of claim 1 further including a wire service channel having a flange for snap engagement with a plurality of tabs on an inside surface of the base section.

7. The pedestal enclosure of claim 1 further including a splice bar pivotably supported between a pair of legs of the bracket system for movement between an locked position wherein a hook at each end of the splice bar engages a respective one of the legs of the bracket system and an unlocked position wherein the splice bar is disengaged from the legs of the bracket system.

8. The pedestal enclosure of claim 1 wherein the base section includes a plurality of knockouts that can be selectively punched out to create openings in the base section.

9. The pedestal enclosure of claim 1 wherein the base section has a generally rectangular configuration and having a plurality of horizontally extending channels formed therein such that the base section is substantially self-supporting in the ground and the cover has a generally cylindrical configuration, the cover being engageable with a cylindrical neck on the base section.

10. The pedestal enclosure of claim 1 further including a grounding bar having a pair of legs configured for snap engagement with corresponding slots in a pair of legs of the bracket system.

11. A pedestal enclosure for electronic components, the enclosure comprising:
    a base section having a generally rectangular configuration and having a plurality of horizontally extending channels formed therein such that the base section is substantially self-supporting in the ground;
    a cover having a generally cylindrical configuration with a generally circular cross-sectional shape, the cover being engageable with a cylindrical neck on the base section so as to define an interior space; and
    a bracket system supported on the base section and arranged in the interior space;
    wherein the base section comprises front and rear housing sections that can be selectively assembled together and split apart without removal of the bracket system.

12. The pedestal enclosure of claim 11 further including a mounting arrangement for releaseably mounting the bracket system to the base section, the mounting arrangement including a channel section at the lower end of each of a pair of legs of the bracket system and a mounting part supported on the base section, each of the mounting parts being configured and arranged to be received in and engage a respective one of the channel sections.

13. The pedestal enclosure of claim 12 wherein the mounting arrangement includes a manually releasable locking mechanism including a window in each of the channel sections and a flexible spring tab supported on each of the mounting parts, each spring tab being engageable with one of the channel sections when the mounting parts are received in the channel sections.

14. The pedestal enclosure of claim 11 further including an alignment brace arranged on opposing sides of a leading edge of one of the front or rear housing sections and defining a generally L-shaped surface that engages opposing sides of a leading edge of the other of the front or rear housing sections when the front and rear housing sections are assembled together.

15. The pedestal enclosure of claim 11 further including a splice bar pivotably supported between a pair of legs of the bracket system for movement between an locked position wherein a hook at each end of the splice bar engages a respective one of the legs of the bracket system and an unlocked position wherein the splice bar is disengaged from the legs of the bracket system.

16. The pedestal enclosure of claim 11 wherein the base section includes a plurality of knockouts that can be selectively punched out to create openings in the base section.

17. A pedestal enclosure for electronic components, the enclosure comprising:
a base section;
a cover engageable with the base section so as to define an interior space;
a bracket system supported on the base section and arranged in the interior space, the bracket system including a backboard supported by a pair of legs, a plurality of wire retaining guides being integrally connected to the backboard; and
a grounding bar including a pair of legs, each leg including a connecting portion that inserts into and snap engages with a respective corresponding slots in the legs of the bracket system.

18. The pedestal enclosure of claim 17 further including a mounting arrangement for releaseably mounting the bracket system to the base section, the mounting arrangement including a channel section at the lower end of each of the pair of legs of the bracket system and a mounting part supported on the base section, each of the mounting parts being configured and arranged to be received in and engage a respective one of the channel sections.

19. The pedestal enclosure of claim 18 wherein the mounting arrangement includes a manually releasable locking mechanism including a window in each of the channel sections and a flexible spring tab supported on each of the mounting parts, each spring tab being engageable with one of the channel sections when the mounting parts are received in the channel sections.

20. The pedestal enclosure of claim 17 wherein the base section comprises front and rear housing sections that can be selectively assembled together and split apart.

21. The pedestal enclosure of claim 20 further including an alignment brace arranged on opposing sides of a leading edge of one of the front or rear housing sections and defining a generally L-shaped surface that engages opposing sides of a leading edge of the other of the front or rear housing sections when the front and rear housing sections are assembled together.

22. The pedestal enclosure of claim 17 further including a wire service channel having a flange for snap engagement with a plurality of tabs on an inside surface of the base section.

23. The pedestal enclosure of claim 17 further including a splice bar pivotably supported between the legs of the bracket system for movement between an locked position wherein a hook at each end of the splice bar engages a respective one of the legs of the bracket system and an unlocked position wherein the splice bar is disengaged from the legs of the bracket system.

24. The pedestal enclosure of claim 17 wherein the base section includes a plurality of knockouts that can be selectively punched out to create openings in the base section.

25. The pedestal enclosure of claim 17 wherein each of the legs of the grounding bar includes a lance for snap engagement with a corresponding opening in the respective slot.

26. A pedestal enclosure for electronic components, the enclosure comprising:
a base section;
a cover engageable with the base section so as to define an interior space;
a bracket system supported on the base section and arranged in the interior space, the bracket system including a pair of legs; and
a splice bar pivotably supported between the legs of the bracket system for movement between a locked position wherein a hook at each end of the splice bar engages a respective one of the legs of the bracket system and an unlocked position wherein the splice bar is disengaged from the legs of the bracket system.

27. The pedestal enclosure of claim 26 further including a mounting arrangement for releaseably mounting the bracket system to the base section, the mounting arrangement including a channel section at the lower end of each of the pair of legs of the bracket system and a mounting part supported on the base section, each of the mounting parts being configured and arranged to be received in and engage a respective one of the channel sections.

28. The pedestal enclosure of claim 27 wherein the mounting arrangement includes a manually releasable locking mechanism including a window in each of the channel sections and a flexible spring tab supported on each of the mounting parts, each spring tab being engageable with one of the channel sections when the mounting parts are received in the channel sections.

29. The pedestal enclosure of claim 26 wherein the base section comprises front and rear housing sections that can be selectively assembled together and split apart.

30. The pedestal enclosure of claim 29 further including an alignment brace arranged on opposing sides of a leading edge of one of the front or rear housing sections and defining a generally L-shaped surface that engages opposing sides of a leading edge of the other of the front or rear housing sections when the front and rear housing sections are assembled together.

31. The pedestal enclosure of claim 26 further including a wire service channel having a flange for snap engagement with a plurality of tabs on an inside surface of the base section.

32. The pedestal enclosure of claim 26 wherein the base section includes a plurality of knockouts that can be selectively punched out to create openings in the base section.

33. A pedestal enclosure for electronic components, the enclosure comprising:
a base section having a generally rectangular configuration and having a plurality of horizontally extending channels formed therein such that the base section is substantially self-supporting in the ground;
a cover having a generally cylindrical configuration with a generally circular cross-sectional shape, the cover being engageable with a cylindrical neck on the base section so as to define an interior space;
a bracket system supported on the base section and arranged in the interior space;
wherein the base section comprises front and rear housing sections that can be selectively assembled together and split apart without removal of the bracket system; and
a detachable wire service channel for receiving one or more wires having a flange for snap engagement with a plurality of tabs on an inside surface of the base section.

* * * * *